(12) United States Patent
Koskela et al.

(10) Patent No.: US 8,019,334 B2
(45) Date of Patent: Sep. 13, 2011

(54) METHOD AND APPARATUS FOR PROVIDING CONTEXT RECOVERY

(75) Inventors: Jarkko T. Koskela, Oulu (FI); Benoist P. Sebire, Tokyo (JP)

(73) Assignee: Nokia Corporation, Espoo (FI)

( * ) Notice: Subject to any disclaimer, the term of this patent is extended or adjusted under 35 U.S.C. 154(b) by 829 days.

(21) Appl. No.: 12/014,381

(22) Filed: Jan. 15, 2008

(65) Prior Publication Data

US 2008/0242292 A1    Oct. 2, 2008

Related U.S. Application Data

(60) Provisional application No. 60/884,951, filed on Jan. 15, 2007.

(51) Int. Cl.
*H04W 24/00* (2009.01)
(52) U.S. Cl. ..................... 455/423; 455/67.11
(58) Field of Classification Search .................. None
See application file for complete search history.

(56) References Cited

U.S. PATENT DOCUMENTS

| | | | |
|---|---|---|---|
| 7,200,110 B1 * | 4/2007 | Burns et al. | 370/225 |
| 2008/0076404 A1 * | 3/2008 | Jen | 455/423 |

FOREIGN PATENT DOCUMENTS

| | | |
|---|---|---|
| EP | 1 903 821 A2 | 3/2008 |
| WO | WO 2008/042906 A2 | 4/2008 |

OTHER PUBLICATIONS

Evolved Universal Terrestrial Radio Access (E-UTRA) and Evolved Universal Terrestrial Radio Access Network (E-UTRAN). 3rd Generation Partnership Project, Stage 2, Release 8, Nov. 2006, ftp://ftp.3gpp.org/specs/archive/36_series/36.300/36300-031.
International Search Report and Written Opinion, PCT/IB2008/000080, Jul. 31, 2008, pp. 1-11.
Nokia: Radio Link Failure and Context Recovery. 3rd Generation Partnership Project, Technical Specification Group, Radio Access Network, Working Group 2, vol. R2-071229, Mar. 30, 2007, pp. 1-3, http://www.3gpp.org/ftp/tsg_ran/WG2_RL2/TSGR2_57bis/Documents/R2-071229.zip.
Nokia: UE behaviour in RRC Connection Re-establishment Scenarios. 3rd Generation Partnership Project, vol. R2-061188, May 12, 2006, pp. 1-20, http://www.3gpp1.net/ftp/tsg_ran/WG2_RL2/TSGR2_53/Documents/R2-061188.zip.

(Continued)

*Primary Examiner* — Erika A Gary
(74) *Attorney, Agent, or Firm* — Ditthavong Mori & Steiner, P.C.

(57) ABSTRACT

An approach is provided for context recovery. A radio link failure condition of a wireless link employed by a mobile unit is detected. An identifier of the mobile unit is received. A determination is whether the mobile unit can re-use connection parameters that were established prior to the failure condition. The mobile unit is instructed to re-use the connection parameters based on the determination.

35 Claims, 12 Drawing Sheets

OTHER PUBLICATIONS

NTT Docomo: RRC Re-establishment Procedure. 3rd Generation Partnership Project, Technical Specification Group, Radio Access Netowrk, Working Group 2, vol. R2-061928, Jun. 30, 2006, pp. 1-6, ftp://ftp.3gpp.org/tsg_ran/WG2_RL2/TSGR2_AHs/2006_06_LTE/Docs/R2-061928.zip.

Samsung, NTT Docomo Inc: Radio Link Failure Handling in LTE. 3rd Generation Partnership Project, vol. R2-061827, Jun. 30, 2006, pp. 1-4, ftp://ftp.3gpp.org/tsg_ran/WG2_RL2/TSGR2_AHs/2006_06_LTE/Docs/R2-061827.zip.

Evolved Universal Terrestrial Access (E-UTRA) and Evolved Universal Terrestrial Radio Access Network (E-UTRAN); Overall description; Stage 2, (Release 8), 3 GPP TS 36.300 v0.1, Nov. 30, 2006, pp. 1-69.

Russian Office action for corresponding RU application No. 2009130913/09(043215) dated Oct. 1, 2010, pp. 1-6.

* cited by examiner

METHOD AND APPARATUS FOR PROVIDING CONTEXT RECOVERY

RELATED APPLICATIONS

This application claims the benefit of the earlier filing date under 35 U.S.C. §119(e) of U.S. Provisional Application Ser. No. 60/884,951 filed Jan. 15, 2007, entitled "Method and Apparatus for Providing Context Recovery," the entirety of which is incorporated by reference.

BACKGROUND

Radio communication systems, such as a wireless data networks (e.g., Third Generation Partnership Project (3GPP) Long Term Evolution (LTE) systems, spread spectrum systems (such as Code Division Multiple Access (CDMA) networks), Time Division Multiple Access (TDMA) networks, etc.), provide users with the convenience of nobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves efficient design of control signaling within the communication system, particularly during link failure and the subsequent recovery process.

Some Exemplary Embodiments

Therefore, there is a need for an approach for providing context recovery, which can co-exist with already developed standards and protocols.

According to one aspect of an embodiment of the invention, a method comprises detecting a radio link failure condition of a wireless link employed by a mobile unit. The method also comprises receiving an identifier of the mobile unit. The method further comprises determining whether the mobile unit can re-use connection parameters in a serving base station of the mobile unit that were established prior to the failure condition and instructing the mobile unit to re-use the connection parameters based on the determination.

According to another aspect of an embodiment of the invention, an apparatus comprises a radio link failure logic configured to detect a radio link failure condition of a wireless link employed by a mobile unit and to receive an identifier of the mobile unit. The radio link failure logic is further configured to determine whether the mobile unit can re-use connection parameters that were established prior to the failure condition and to instruct the mobile unit to re-use the connection parameters based on the determination.

According to another aspect of an embodiment of the invention, a method comprises detecting failure of a radio link. The method also comprises transmitting an identifier to a serving base station in response to the detection for context recovery and receiving a message indicating that context associated with the radio link is to be re-used.

According to another aspect of an embodiment of the invention, an apparatus comprises logic configured to detect failure of a radio link. An identifier is transmitted to a serving base station in response to the detection for context recovery. The logic is further configured to receive a message indicating that context associated with the radio link is to be re-used.

According to another aspect of an embodiment of the invention, a system comprises means for detecting a radio link failure condition of a wireless link employed by a mobile unit. The system also comprises means for receiving an identifier of the mobile unit. The system further comprises means for determining whether the mobile unit can re-use connection parameters that were established prior to the failure condition. The system also comprises means for instructing the mobile unit to re-use the connection parameters based on the determination.

According to yet another aspect of an embodiment of the invention, a system comprises means for detecting failure of a radio link. The system also comprises means for transmitting an identifier to a serving base station in response to the detection for context recovery. The system also comprises means for receiving a message indicating that context associated with the radio link is to be re-used.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENTS

An apparatus, method, and software for providing an efficient context recovery are disclosed. In the following description, for the purposes of explanation) numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a communication network having a Third Generation Partnership Project (3GPP) Long Term Evolution (LTE) architecture, it is recognized by one of ordinary skill in the art that the embodiments of the inventions have applicability to any type of communication system and equivalent functional capabilities.

Figure 1:
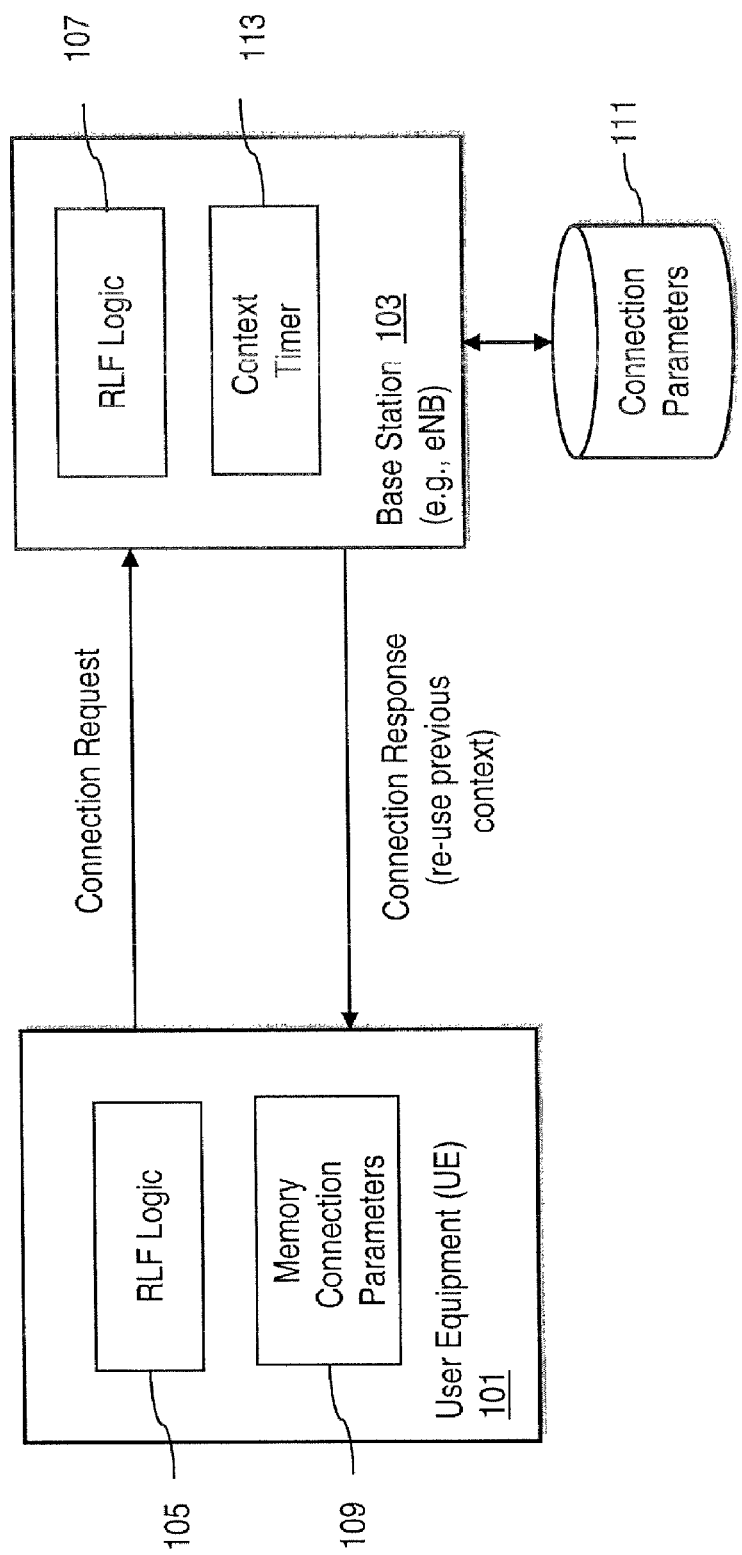
FIG. 1 is a diagram of a user equipment (UE) and a base station capable of executing mobility procedures upon failure of a communication link, according to an exemplary embodiment of the invention.
Figure 2A:
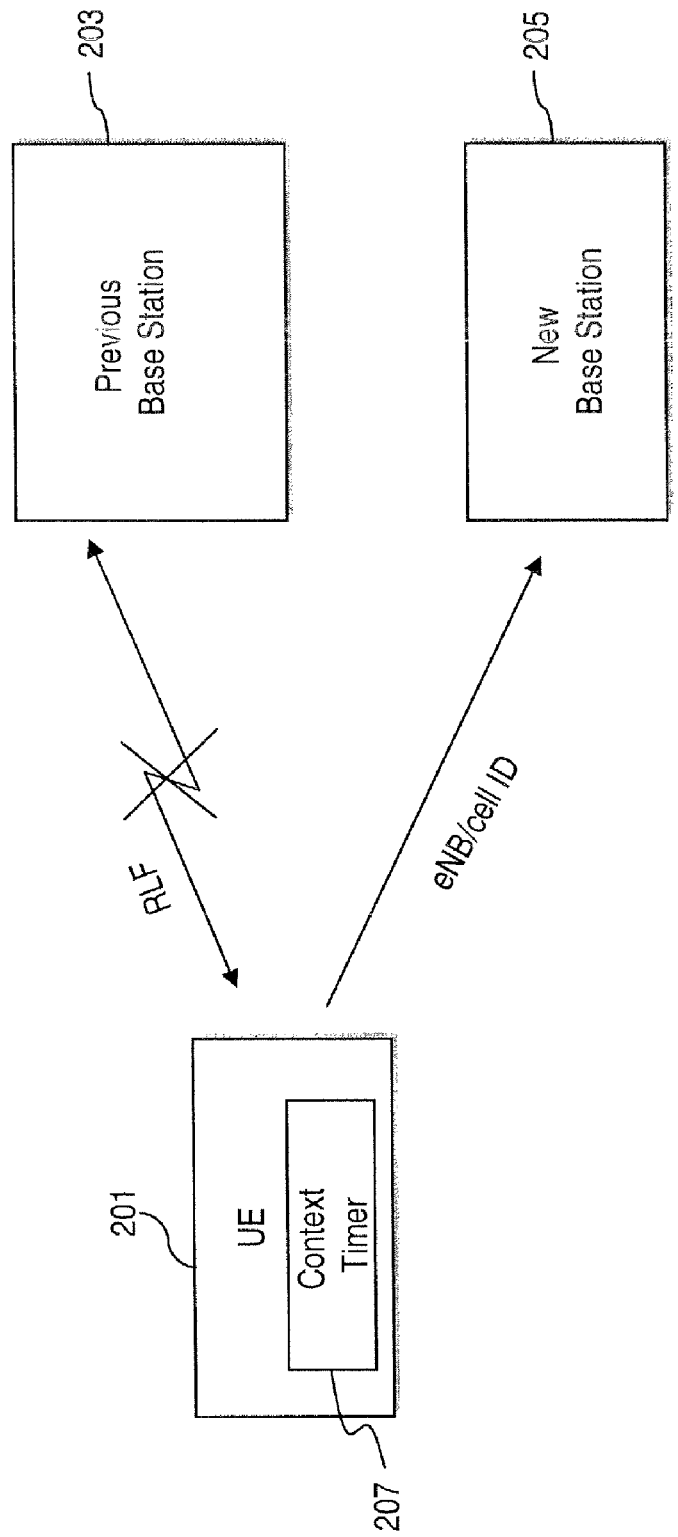
FIGS. 2A and 2B are diagrams of exemplary scenarios for managing connection parameters in a recovery process, in accordance with an embodiment of the invention.
Figure 2B:
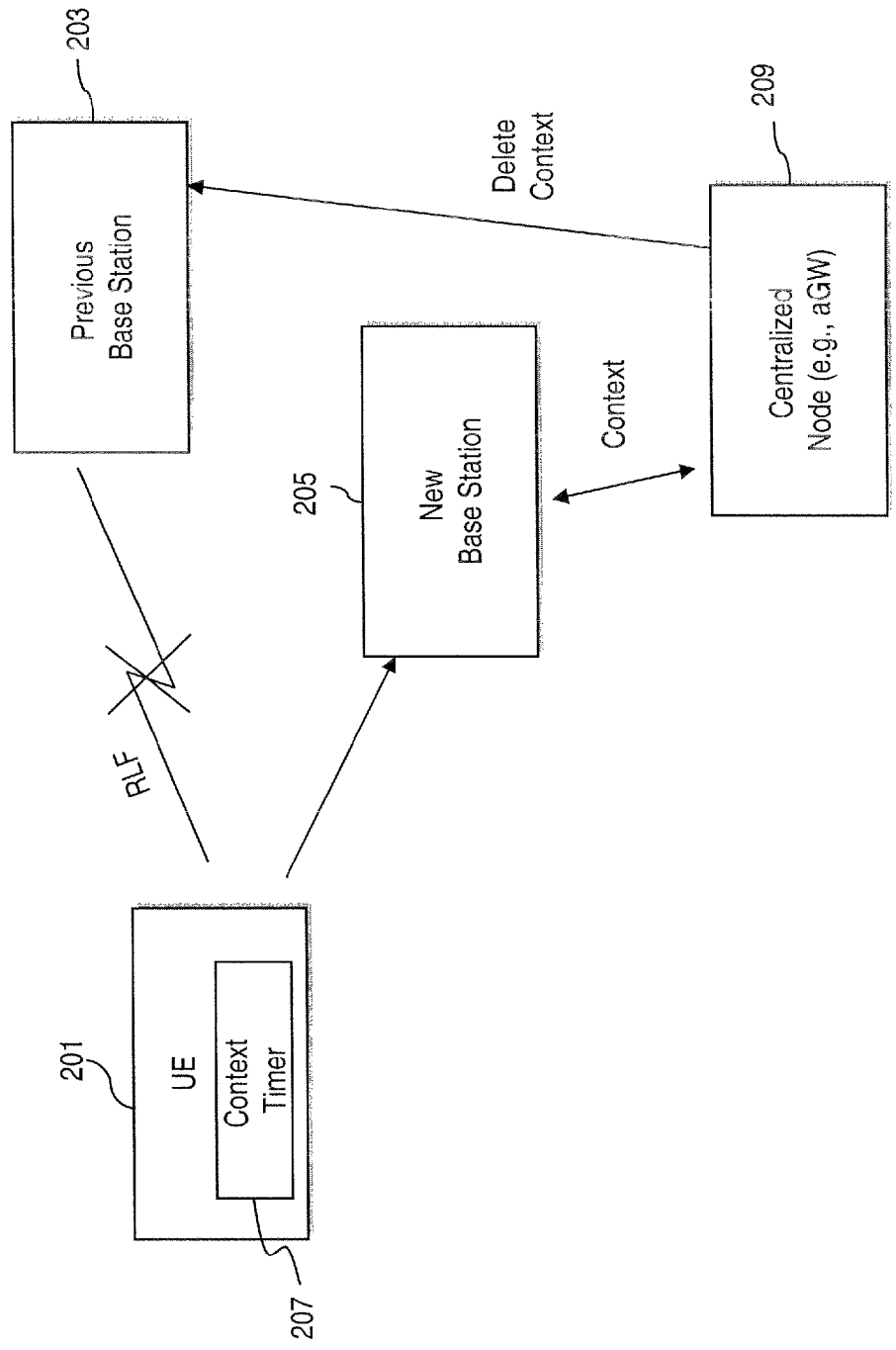

FIG. 1 is a diagram of a user equipment (UE) and a base station capable of executing mobility procedures upon failure of a communication link, according to an exemplary embodiment of the invention. As shown, a user equipment (UE) 101 communicates with a base station, which under the 3GPP LTE architecture is denoted as an enhanced Node B (eNB) 103. The UE 101 can be any type of mobile stations, such as handsets, terminals, stations, units, devices, or any type of interface to the user (such as "wearable" circuitry, etc.). At times, the communication link between the UE 101 and the eNB 103 can experience failure, which can stem from various sources, including environmental radio conditions, equipment failure, etc. This is referred to as a radio link failure (RLF). Accordingly, the UE 101 and the eNB 103 employ RLF logic 105 and 107, respectively, to detect link failures and to perform the recovery process for restoring communications. To efficiently recover from the link failure, the UE 101 maintains connection parameters (i.e., context) within a memory 109. These connection parameters are coordinated with those of the eNB 103, which stores such information within a database 11 (or any type of storage medium). Effectively, upon discovery or detection of the link failure, the UE 101 seeks to re-establish connection, whereby the eNB 103 can instruct the UE 101 to re-use existing connection parameters. As shown, the eNB 103 can utilize a context timer 113 to track whether certain contexts are still valid for re-use; it is contemplated that such a timer can also be deployed in the UE 101 (as shown in FIGS. 2A and 2B).

By way of example, the communication of FIG. 1 utilizes an architecture compliant with the long term evolution (LTE) of universal terrestrial radio access network (UTRAN) in 3GPP; this more fully described below with respect to FIGS. 4A-4D. One approach for handling of access stratum (AS) context in an LTE system is defined as follows, in Table 1:

eNB). In turn, the base station 103 transmits an RRC connection setup message to the UE 101; the UE 101 subsequently transmits an RRC connection setup complete message to the base station 103. As part of the RRC protocol, two connection states can be fined: RRC_IDLE and RRC_CONNECTED. In the RRC_IDLE state, no RRC context is stored in the base station 103. However, the UE 101 is associated with a predetermined (or pre-assigned) unique identifier. When the UE 101 is in the RRC_CONNECTED, the UE 110 has context in the base station 103, which knows the cell to which the UE 101 belongs.

It is recognized that a possible case exists in which after RLF detection, the UE 101 selects a cell that belongs to same eNB 103 (where the RLF occurred). The system of FIG. 1 permits the UE to re-use context information (e.g., Cell Radio Network Temporary Identity (C-RNTI)) under this scenario; this capability is more fully described in FIGS. 2-3. The recovery process is illustrated in FIGS. 2A and 2B.

FIGS. 2A and 2B are diagrams of exemplary scenarios for managing connection parameters in a recovery process, in accordance with an embodiment of the invention. In the scenario of FIG. 2A, a UE 201 experiences a link failure with a serving base station 203 (which is denoted as a "previous" base station). As part of its cell reselection procedure, the UE 201 can initiate communication with a new serving base station 205.

A context timer 207, in an exemplary embodiment, can be used to determine whether "stale" context information can be deleted. In particular, whenever the UE 201 has not been responding to the eNB 203 (e.g., UE 201 does not respond to allocations in the L1/L2 signaling), the UE 201 can start the timer 207, which causes, at expiry, removal of UE contexts. It is noted that the expiry period is configurable and can be set appropriately as to avoid the case where the UE 201 would experience two RLFs and resume service with the original eNB 203 (but with a context that is actually different from the original one).

Alternatively, as shown in FIG. 2B, the identity of the old or prior cell could be mentioned in the RRC connection request in case of radio link failure. The new eNB 205 may indicate that there are no context in this eNB 205. The UE 201 sends an identifier of a previous serving base station and/or cell identifier (denoted "eNB/cell ID") in a connection request message. This old eNB/cell information can also be used in the selected eNB 205 to determine whether the eNB 205 has valid contexts stored for this UE 201, which could be

TABLE 1

| Cases | First Phase | Second Phase | T2 expired |
|---|---|---|---|
| UE 101 returns to the same cell | Continue as if no radio problems occurred | Activity cannot be resumed without interaction between UE 101 and eNB 103 Normally not via RRC_IDLE | Go via RRC_IDLE (Radio Resource Control (RRC) idle state) |
| UE 101 selects a different cell from the same eNB 103 | N/A | Unspecified | Go via RRC_IDLE |
| UE 101 selects a cell of a different eNB 103 | N/A | Go via RRC_IDLE | Go via RRC_IDLE |

The above procedure is more fully described in 3GPP TS 36.300 v.0.3.1, which is incorporated herein by reference in its entirety. The radio resource connection (RRC) procedure involves, in general terms, the UE 101 transmitting an RRC connection request message to the base station 103 (e.g., used in the new cell selected by the UE 201. According to one embodiment, whenever the UE 201 accesses new eNB 205, the eNB 205 requests context from a centralized node 209 (e.g., aGW of FIG. 4C), which will inform previous or old serving eNB 203 that UE 201 has accessed a new cell belonging to eNB 205. Alternatively, whenever the UE 201 accesses a new eNB 205, the eNB 205 can request context from the old eNB 203 and inform the UE 201 that the old context can be re-used.

Figure 3:
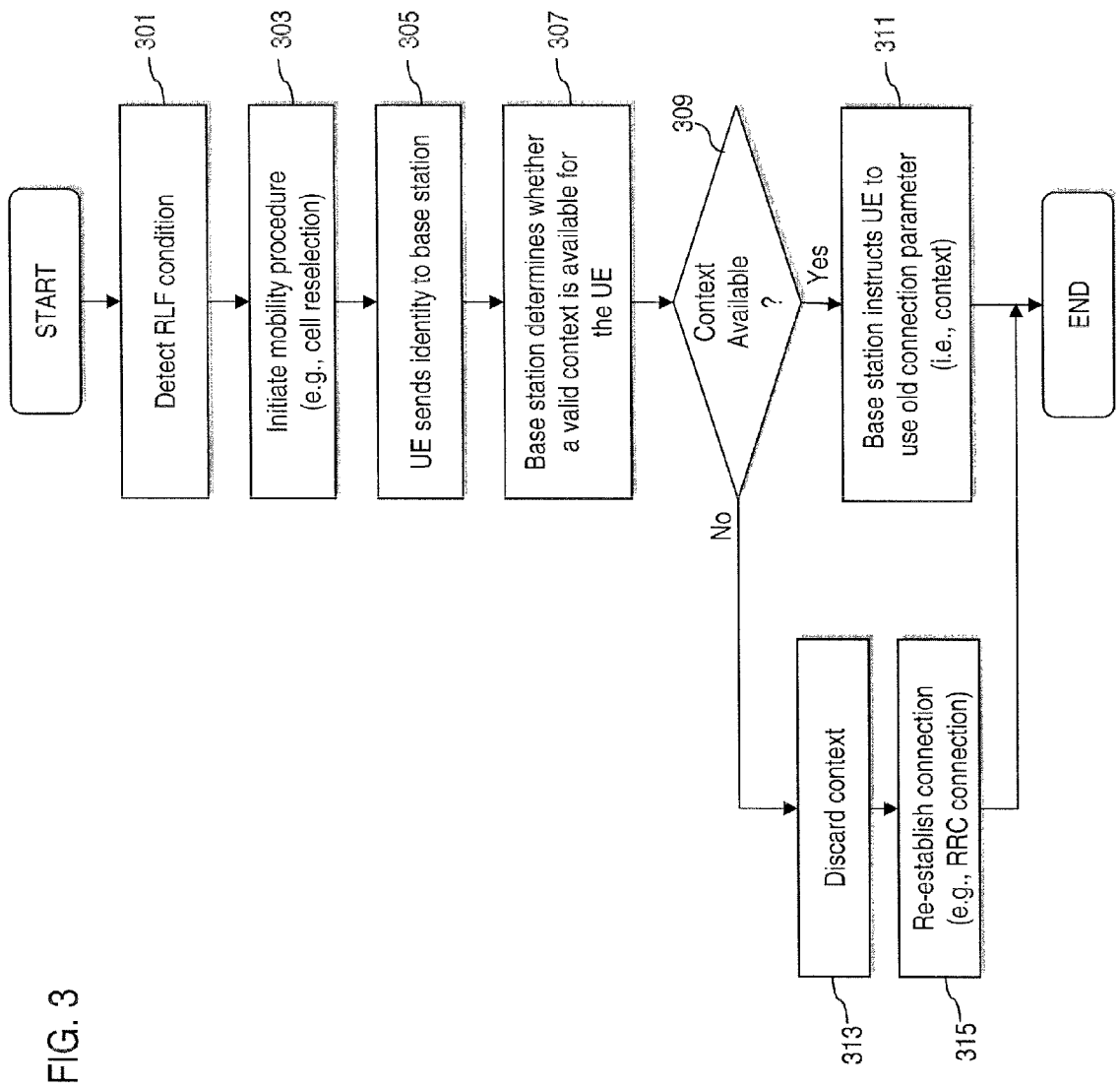
FIG. 3 is a flowchart of a process for providing context recovery, in accordance with an embodiment of the invention.

FIG. 3 is a flowchart of a process for providing context recovery, in accordance with an embodiment of the invention. This process is described with respect to the system of FIG. 1. When radio link failure (RLF) is detected (per step 301), and the UE 101 starts subsequent mobility procedures (i.e., cell reselection) whereby the UE 101 selects a new cell, as in step 303. When the UE 101 accesses a new cell, the UE 101 sends a UE identity to the base station 103, per step 305. Through this identity, the base station 103, which manages the cell, can detect whether the UE 101 was previously operating within the serving area of this base station 103 prior to the RLF condition. That is, the base station 103 determines whether the UE 101 is within its coverage area prior to the radio link failure. In step 307, the base station 103 determines whether a valid context (i.e., not stale) exists for the particular UE 101. If there is a valid context for the UE 101 (per step 309), then the base station 103 instructs, as in step 311, the UE 101 to re-use the existing context—i.e., connection parameter(s). Thus, if the context is still retained by the base station 103, the base station 103 can indicate to the UE 101 that the UE 101 may continue utilizing this information. Otherwise, the UE 101 is instructed to discard the context and re-establish connection, per steps 313 and 315.

From the UE point of view, this process provides a simple procedure: upon RLF, the contexts are maintained until a new cell is selected. After the access procedure, it is the base station 103 that notifies or otherwise instructs the UE 101 whether the context can be re-used or whether the context needs to be implicitly discarded when connections need to be reestablished.

As mentioned, the UE 101 and base station 103 can be configured to operate in an LTE architecture, which is next described.

FIGS. 4A-4D are diagrams of communication systems having exemplary LTE architectures, in which the system of FIG. 1 can operate, according to various exemplary embodiments of the invention. By way of example (shown in FIG. 1), the base station and the UE can communicate in system 400 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (SC-FDMA) or a combination thereof. In an exemplary embodiment, both uplink and downlink can utilize WCDMA. In another exemplary embodiment, uplink utilizes SC-FDMA, while downlink utilizes OFDMA.

The MME (Mobile Management Entity)/Serving Gateways 401 are connected to the eNBs in a full or partial mesh configuration using tunneling over a packet transport network (e.g., Internet Protocol (IP) network) 403. Exemplary functions of the MME/Serving GW 401 include distribution of paging messages to the eNBs, IP header compression, termination of U-plane packets for paging reasons, and switching of U-plane for support of UE mobility. Since the GWs 401 serve as a gateway to external networks, e.g., the Internet or private networks 403, the GWs 401 include an Access, Authorization and Accounting system (AAA) 405 to securely determine the identity and privileges of a user and to track each user's activities. Namely, the MME Serving Gateway 401 is the key control-node for the LTE access-network and is responsible for idle mode UE tracking and paging procedure including retransmissions. Also, the MME 401 is involved in the bearer activation/deactivation process and is responsible for selecting the SGW (Serving Gateway) for a UE at the initial attach and at time of intra-LTE handover involving Core Network (CN) node relocation.

A more detailed description of the LTE interlace is provided in 3GPP TR 25.813, entitled "E-UTRA and F-UTRAN: Radio Interface Protocol Aspects," which is incorporated herein by reference in its entirety.

Figure 4A:
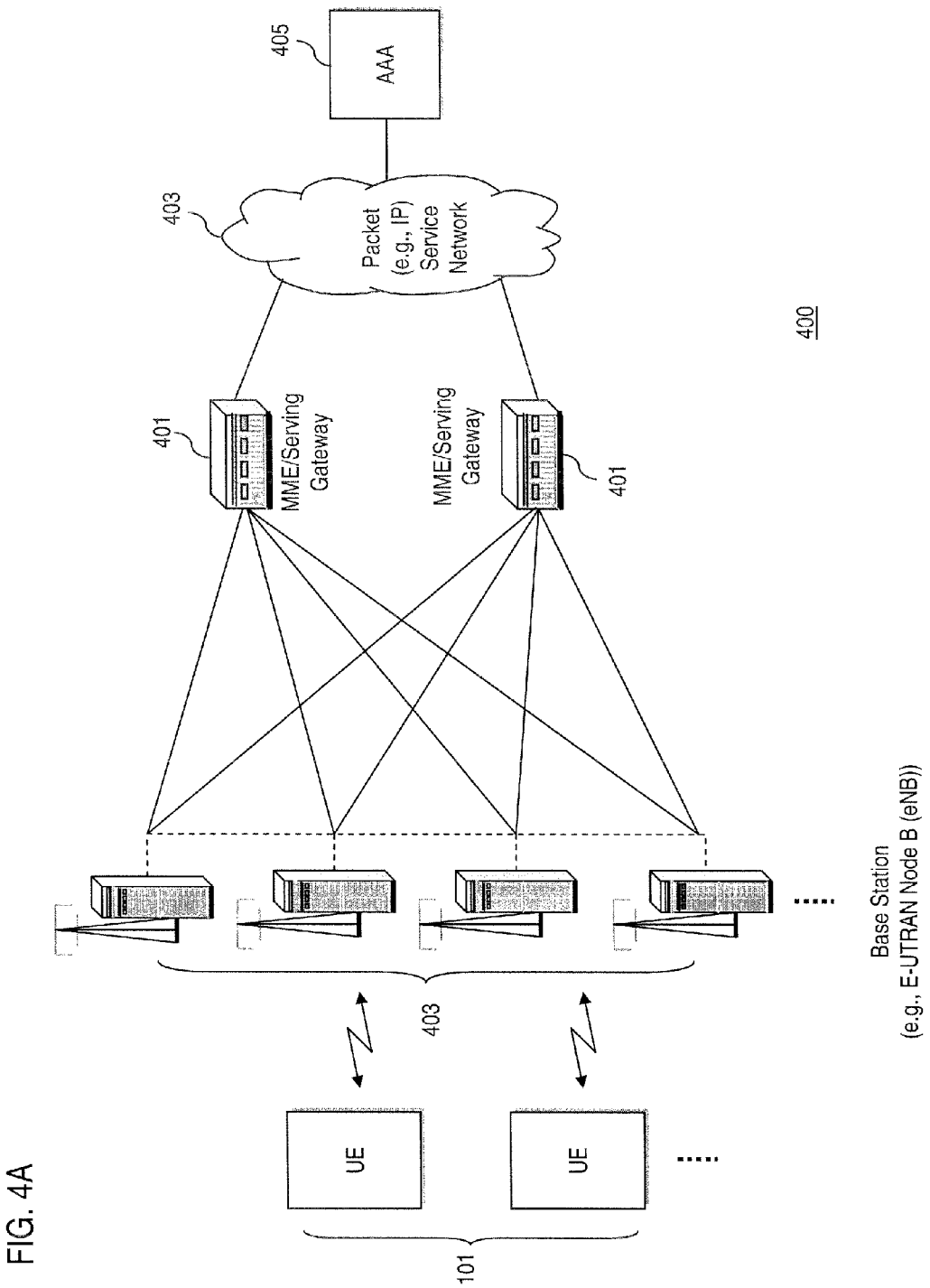
FIGS. 4A-4D are diagrams of communication systems having exemplary long-term evolution (LTE) architectures, in which the system of FIG. 1 can operate, according to various exemplary embodiments of the invention.
Figure 4B:
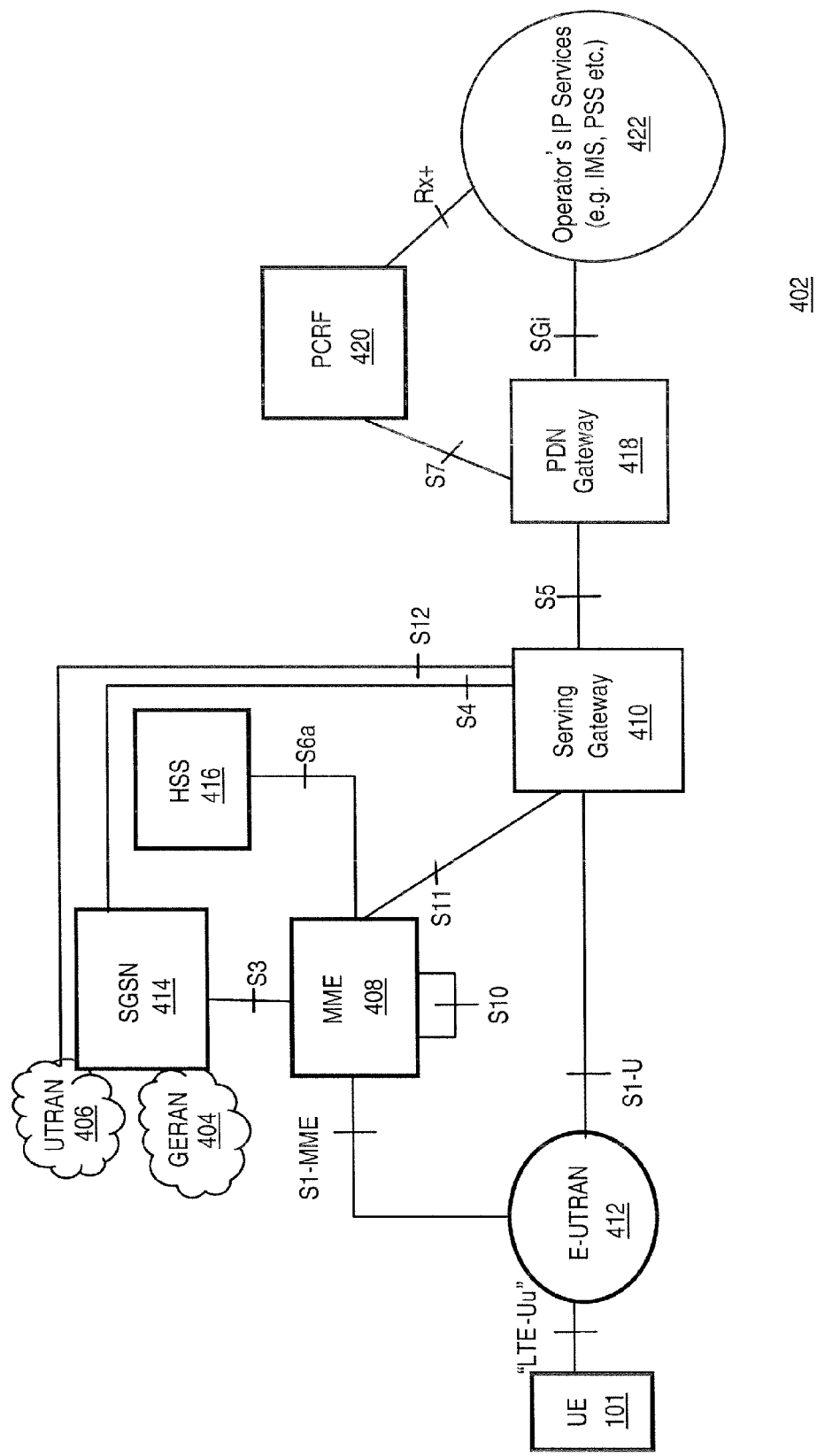

In FIG. 4B, a communication system 402 supports GERAN (GSM/EDGE radio access) 404, and UTRAN 406 based access networks, E-UTRAN 412 and non-3GPP (not shown) based access networks, and is more fully described in TR 23.882, which is incorporated herein by reference in its entirety. A key feature of this system is the separation of the network entity that performs control-plane functionality (MME 408) from the network entity that performs bearer-plane functionality (Serving Gateway 410) with a well defined open interface between them S11. Since E-UTRAN 412 provides higher bandwidths to enable new services as well as to improve existing ones, separation of MME 408 from Serving Gateway 410 implies that Serving Gateway 410 can be based on a platform optimized for signaling transactions. This scheme enables selection of more cost-effective platforms for, as well as independent scaling of, each of these two elements. Service providers can also select optimized topological locations of Serving Gateways 410 within the network independent of the locations of MMEs 408 in order to reduce optimized bandwidth latencies and avoid concentrated points of failure.

The basic architecture of the system 402 contains following network elements. As seen in FIG. 4B, the E-UTRAN (e.g., eNB) 412 interfaces with LTE via LTE-Uu. The E-UTRAN 412 supports LTE air interface and includes functions for radio resource control (RRC) functionality corresponding to the control plane MME 408. The E-UTRAN 412 also performs a variety of functions including radio resource management, admission control, scheduling, enforcement of negotiated uplink (UL) QoS (Quality of Service), cell information broadcast, ciphering/deciphering of user, compression/decompression of downlink and uplink user plane packet headers and Packet Data Convergence Protocol (PDCP).

The MME 408, as a key control node, is responsible for managing mobility UE identifies and security parameters and paging procedure including retransmissions. The MME 408 is involved in the bearer activation/deactivation process and is also responsible for choosing Serving Gateway 410 for the UE. MME 408 functions include Non Access Stratum (NAS) signaling and related security. MME 408 checks the authorization of the UE to camp on the service provider's Public Land Mobile Network (PLMN) and enforces UE roaming restrictions. The MME 408 also provides the control plane function for mobility between LTE and 2G/3G access networks with the S3 interface terminating at the MME 408 from the SGSN (Serving GPRS Support Node) 414. The principles of PLMN selection in E-UTRA are based on the 3GPP PLMN selection principles. Cell selection can be required on transition from MME_DETACHED to EMM-IDLE or EMM-CONNECTED. The cell selection can be achieved when the UE NAS identifies a selected PLMN and equivalent PLMNs. The UE 101 searches the E-UTRA frequency bands and for each carrier frequency identifies the strongest cell. The UE 101 also reads cell system information broadcast to identify its PLMNs. Further, the UE 101 seeks to identify a suitable cell; if it is not able to identify a suitable cell, it seeks to identify an acceptable cell. When a suitable cell is found or if only an acceptable cell is found, the UE 101 camps on that cell and commences the cell reselection procedure. Cell selection identifies the cell that the UE 101 should camp on.

The SGSN 414 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 408 and HSS (Home Subscriber Server) 416. The S10 interface between MMEs 408 provides MME relocation and MME 408 to MME 408 information transfer. The Serving Gateway 410 is the node that terminates the interface towards the E-UTRAN 412 via S1-U.

The S1-U interface provides a per bearer user plane tunneling between the E-UTRAN 412 and Serving Gateway 410. It contains support for path switching during handover between eNBs 412. The S4 interface provides the user plane with related control and mobility support between SGSN 414 and the 3GPP Anchor function of Serving Gateway 410.

The S12 is an interface between UTRAN 406 and Serving Gateway 410. Packet Data Network (PDN) Gateway 418 provides connectivity to the UE to external packet data networks by being the point of exit and entry of traffic for the UE. The PDN Gateway 418 performs policy enforcement, packet filtering for each user, charging support, lawful interception and packet screening. Another role of the PDN Gateway 418 is to act as the anchor for mobility between 3GPP and non-3GPP technologies such as WiMax and 3GPP2 (CDMA 1X and EvDO (Evolution Data Only)).

The S7 interface provides transfer of QoS policy and charging rules from PCRF (Policy and Charging Role Function) 420 to Policy and Charging Enforcement Function (PCEF) in the PDN Gateway 418. The SGi interface is the interface between the PDN Gateway and the operator's IP services including packet data network 422. Packet data network 422 may be an operator external public or private packet data network or an intra operator packet data network, e.g., for provision of IMS (IP Multimedia Subsystem) services. Rx+ is the interface between the PCRF and the packet data network 422.

Figure 4C:
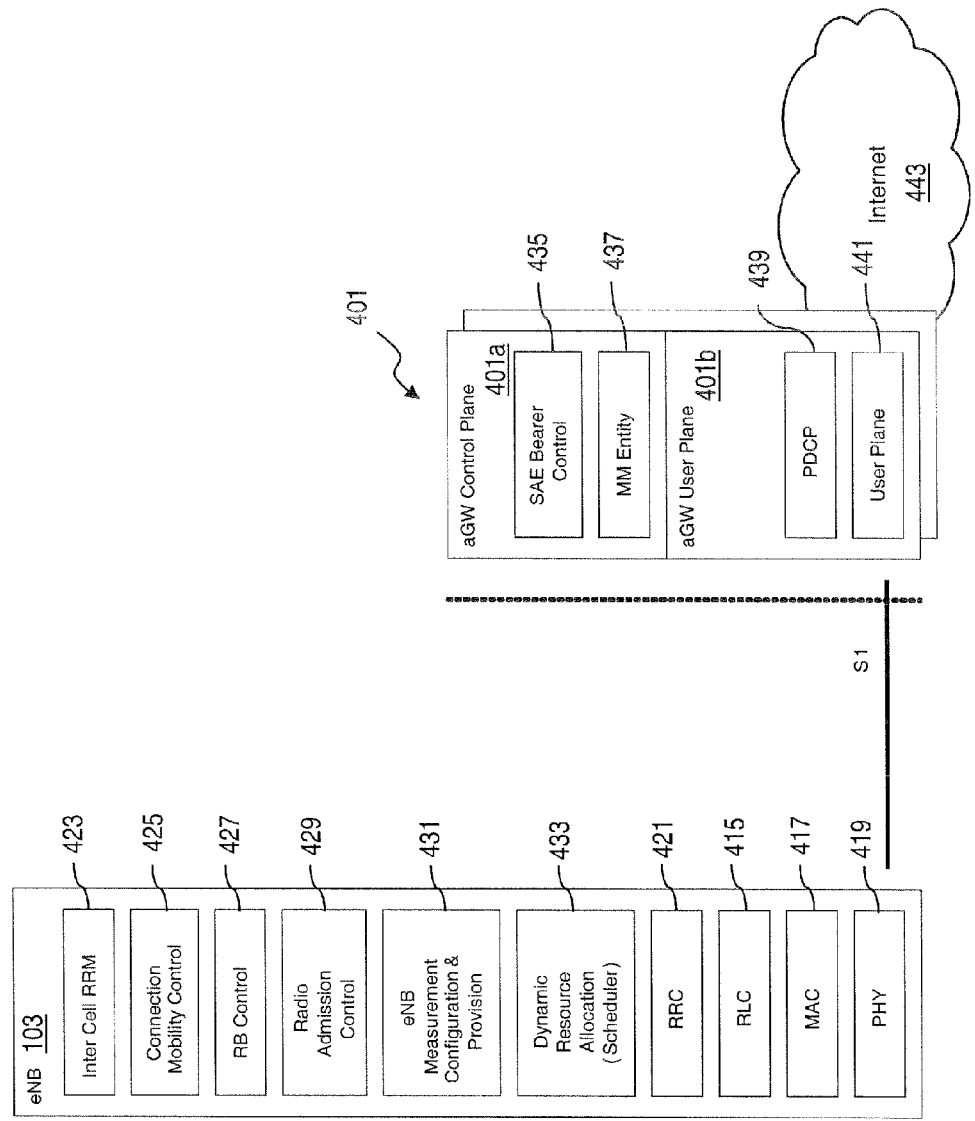

As seen in FIG. 4C, the eNB utilizes an E-UTRA (Evolved Universal Terrestrial Radio Access) (user plane, e.g., RLC (Radio Link Control) 415, MAC (Media Access Control) 417, and PHY (Physical) 419, as well as a control plane (e.g., RRC 421)). The eNB also includes the following functions: Inter Cell RRM (Radio Resource Management) 423, Connection Mobility Control 425, RB (Radio Bearer) Control 427, Radio Admission Control 429, eNB Measurement Configuration and Provision 431, and Dynamic Resource Allocation (Scheduler) 433.

The eNB communicates with the aGW 401 (Access Gateway) via an S1 interface. The aGW 401 includes a User Plane 401a and a Control plane 401b. The control plane 401b provides the following components: SAE (System Architecture Evolution) Bearer Control 435 and MM (Mobile Management) Entity 437. The user plane 401b includes a PDCP (Packet Data Coverenece Protocol) 439 and a user plane functions 441. It is noted that the functionality of the aGW 209 can also be provided by a combination of a serving gateway (SGW) and a packet data network (PDN) GW. The aGW 401 can also interface with a packet network, such as the Internet 443.

Figure 4D:
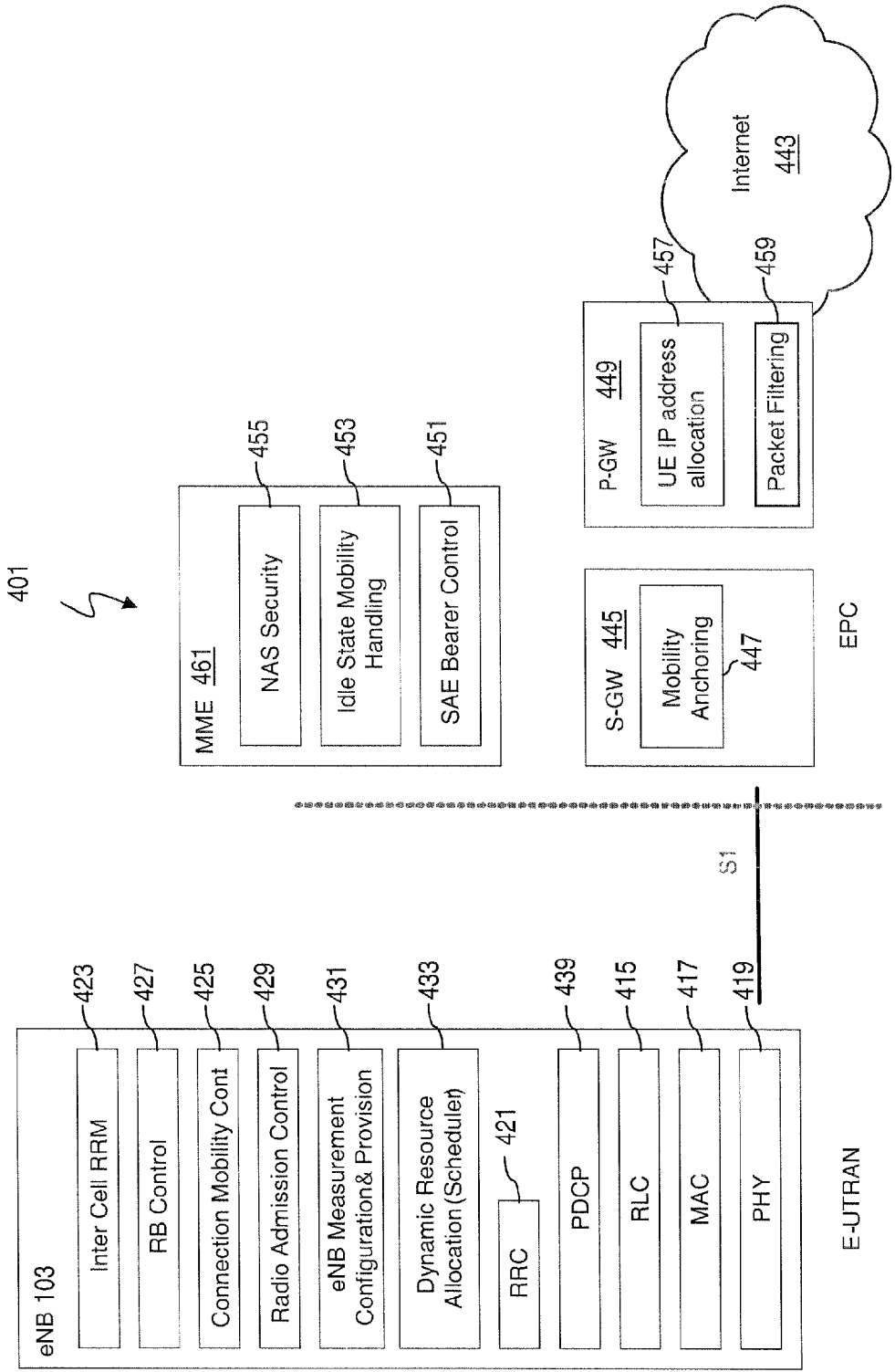

In an alternative embodiment, as shown in FIG. 4D, the PDCP (Packet Data Convergence Protocol) functionality can reside in the eNB rather than the GW 401. Other than this PDCP capability, the eNB functions of FIG. 4C are also provided in this architecture.

In the system of FIG. 4D, a functional split between E-UTRAN and EPC (Evolved Packet Core) is provided. In this example, radio protocol architecture of E-UTRAN is provided for the user plane and the control plane. A more detailed description of the architecture is provided in 3GPP TS 36.300.

The eNB interfaces via the S1 to the Serving Gateway 445, which includes a Mobility Anchoring function 447, and to a Packet Gateway (P-GW) 449, which provides an UE IP address allocation function 457 and Packet Filtering function 459. According to this architecture, the MME (Mobility Management Entity) 461 provides SAE (System Architecture Evolution) Bearer Control 451, Idle State Mobility Handling 453, NAS (Non-Access Stratum) Security 455.

Figure 5:
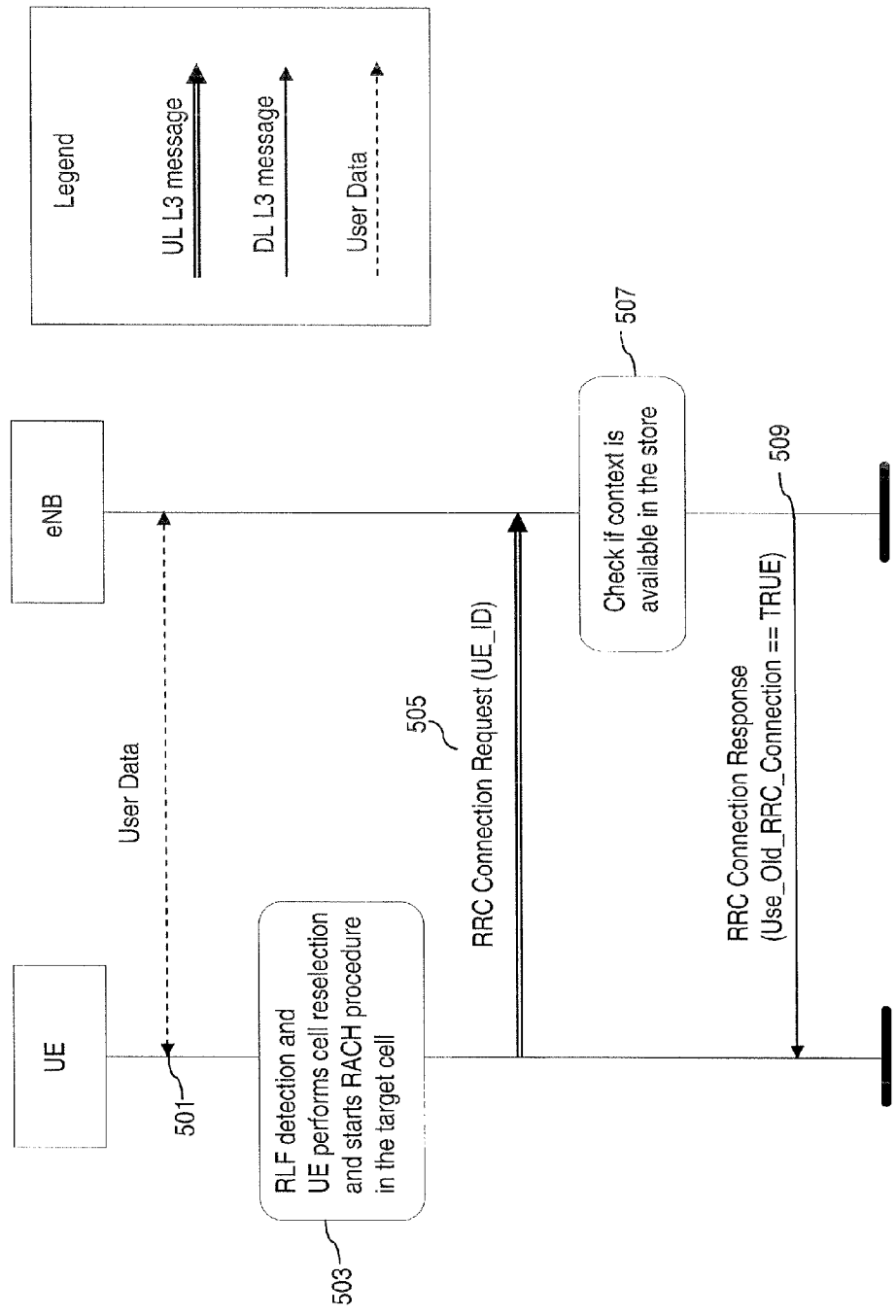
FIG. 5 is a diagram of a process for providing context recovery in which context re-use is performed, in accordance with an embodiment of the invention.
Figure 6:
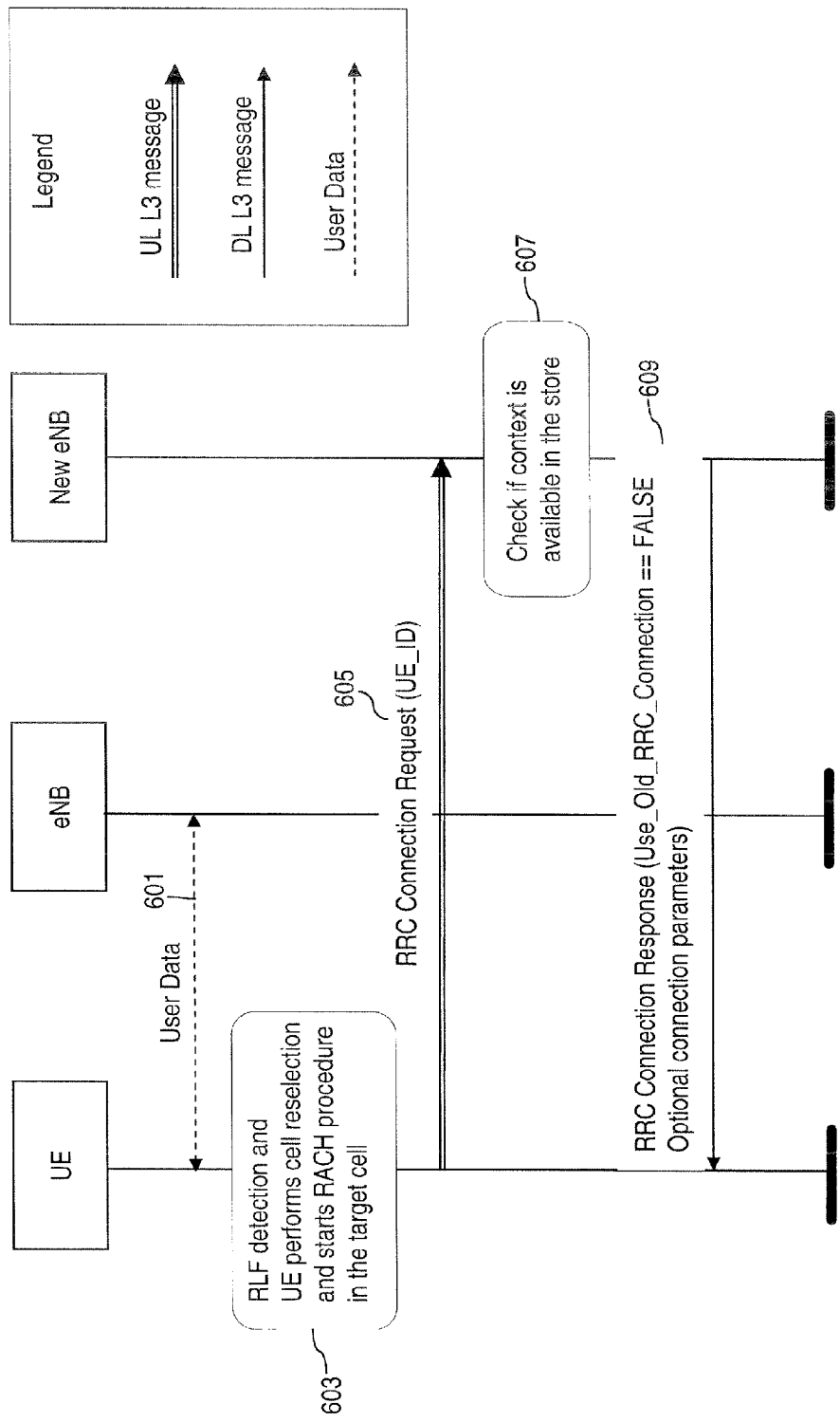
FIG. 6 is a diagram of a process for providing context recovery in which connection re-establishment is performed, in accordance with an embodiment of the invention.

FIGS. 5 and 6 show how the process of FIG. 3 can be implemented in an LTE system. In particular, FIG. 5 is a diagram of a process for providing context recovery in which context re-use is performed, in accordance with an embodiment of the invention. By way of example, these processes are explained with respect to the system of FIG. 2A. As shown, the UE 201 and eNB 203 are exchanging user data until link failure occurs (step 501). When RLF is detected (assuming the UE 201 in an active state, i.e., LTE_ACTIVE state), UE 201 starts UE based mobility procedures—namely initiates a Random Access Channel (RACH) procedure in the target cell. Accordingly, the UE 201 selects a new cell where the UE 201 attempts to re-establish RRC connections. When the selected cell (i.e., base station) receives a RRC CONNECTION REQUEST from the UE 201 (step 505), the base station checks whether it has old RRC contexts (which may include any non-cell specific access stratum (AS) parameters or other AS related parameters) stored, per step 507. If so, the base station generates a RRC CONNECTION RESPONSE) which can include a field to specify use of the old RRC connection parameters: Use_OLD_RRC_Connection is set to "TRUE."

The above process a mechanism for determining how the new cell (i.e., new serving base station 205) acquires knowledge of whether the UE 201 has valid context stored in the eNB 203. In one embodiment, the UE 201 sends a UE identity (UE-ID) in a RRC connection request. The identity is utilized to perform contention resolution; this approach additionally has the eNB 203 check whether the eNB 203 has some old parameters stored related to that UE 201. If the eNB 203 finds stored parameters that correspond to (i.e., match) the UE-ID (which may be either Cell Radio Network Temporary Identity (C-RNTI), International Mobile Subscriber Identity (IMSI), Temporary Mobile Subscriber Identity (Identifier) (TMSI), International Mobile Equipment Identity (IMEI) or any similar identity), the eNB 203 sends as a response to RRC CONNECTION REQUEST a message (e.g., RRC CONNECTION RESPONSE). The message indicates that the UE 201 may re-use previous RRC context from the earlier camped cell (see FIG. 5).

FIG. 6 shows communication with a new serving base station, according to one embodiment. In this example, the UE 201 first communicates with the eNB 203 until link failure is detected (steps 601 and 603). Under this scenario, the UE 201 sends an RRC CONNECTION REQUEST that includes the UE ID to a new serving eNB 205, per step 605. The new serving eNB 205 determines whether context information corresponding to the UE ID is stored locally, as in step 607. If the context is not found, normal RRC connection establishment procedure can occur. Consequently, the UE 201 may implicitly delete any stored RRC contexts that were applicable in the old cell. As such, the new eNB 205 responds with an RRC CONNECTION RESPONSE indicating that the old context is not to be utilized.

Therefore, given the above processes, a link failure condition does not lead to the deletion of the context in UE 201 and the network (e.g., eNB 203). For example, after RRC_CONNECTION_REQUEST from the UE 201 to the network, the eNB 203 checks the identity of the U E 201 to determine whether a valid context is available for that UE 201. In the RRC_CONNECTION_RESPONSE from the network to UE 201, the eNB 203 instructs the UE 201 whether to re-use the previous context, or initiate a new establishment (implicitly deleting the stored contexts. Also in one embodiment, the identify of the previous cell or eNB 203 may be provided.

One of ordinary skill in the art would recognize that the processes for context recovery may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 7.

Figure 7:
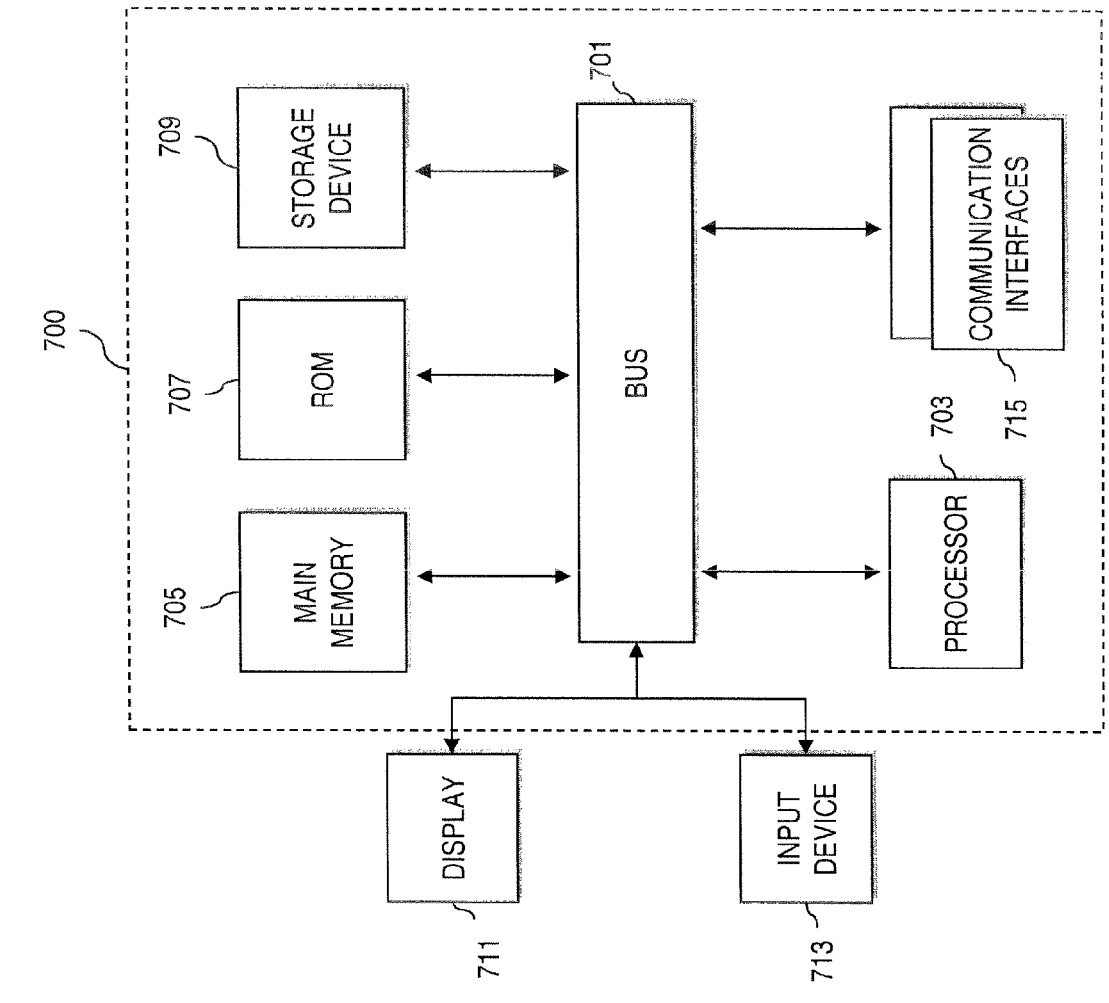
FIG. 7 is a diagram of hardware that can be used to implement an embodiment of the invention.

FIG. 7 illustrates exemplary hardware upon which various embodiments of the invention can be implemented. A computing system 700 includes a bus 701 or other communication mechanism for communicating information and a processor 703 coupled to the bus 701 for processing information. The computing system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computing system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computing system 700 may be coupled via the bus 701 to a display 711, such as a liquid crystal display, or active matrix display, for displaying information to a user. An input device 713, such as a keyboard including alphanumeric and other keys, may be coupled to the bus 701 for communicating information and command selections to the processor 703. The input device 713 can include a cursor control, such as a mouse, a trackball, or cursor direction keys, for communicating direction information and command selections to the processor 703 and for controlling cursor movement on the display 711.

According to various embodiments of the invention, the processes described herein can be provided by the computing system 700 in response to the processor 703 executing an arrangement of instructions contained in main memory 705. Such instructions call be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 700 also includes at least one communication interface 715 coupled to bus 701. The communication interface 715 provides a two-way data communication coupling to a network link (not shown). The communication interface 715 sends and receives electrical, electromagnetic, or optical signals that carry digital data streams representing various types of information. Further, the communication interface 715 can include peripheral interface devices, such as a Universal Serial Bus (USB) interface, a PCMCIA (Personal Computer Memory Card International Association) interface, etc.

The processor 703 may execute the transmitted code while being received and/or store the code in the storage device 709, or other non-volatile storage for later execution. In this manner, the computing system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM. CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 8:
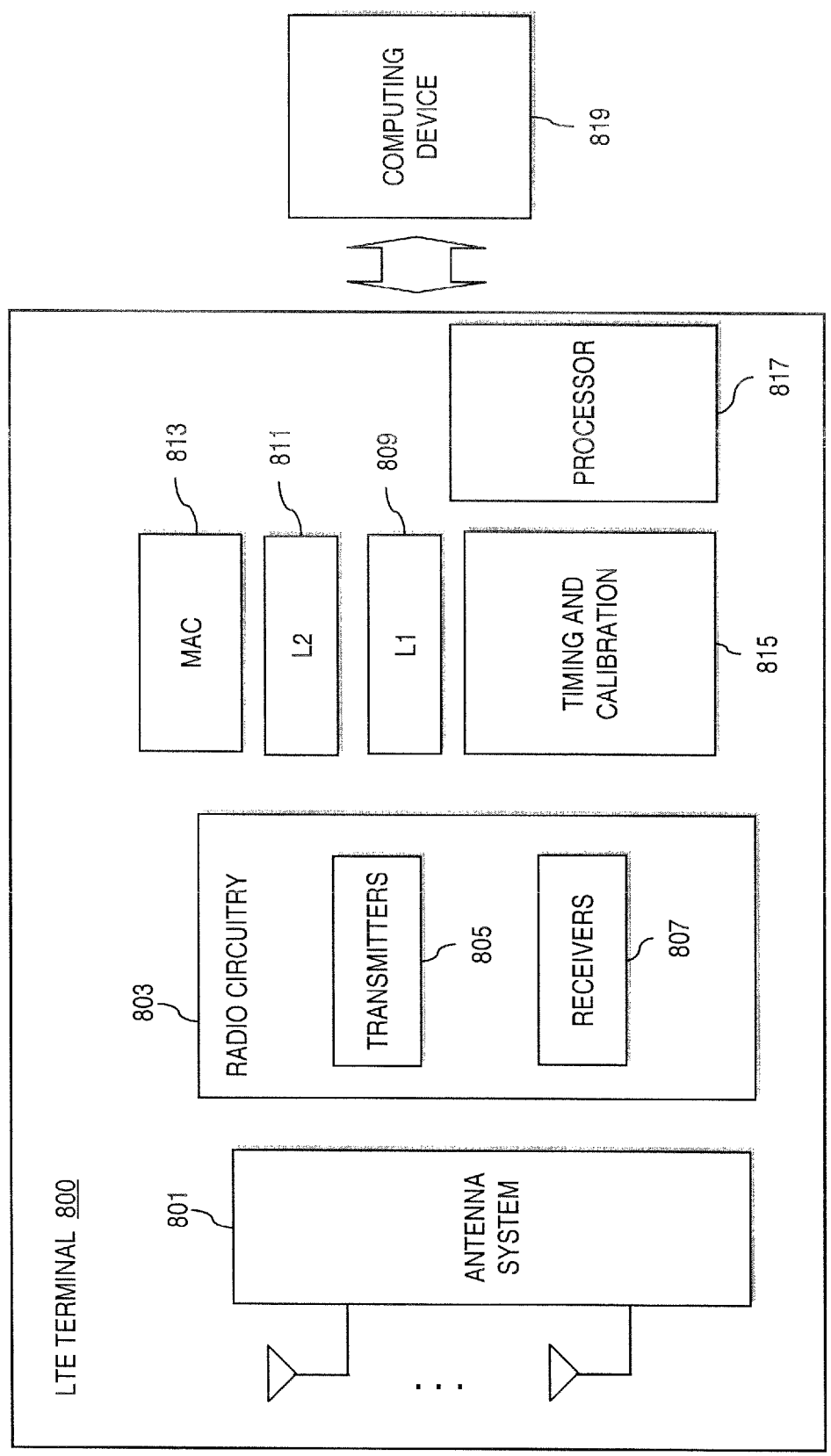
FIG. 8 is a diagram of exemplary components of an LTE terminal configured to operate in the systems of FIGS. 4A-4D, according to an embodiment of the invention.

FIG. 8 is a diagram of exemplary components of an LTE terminal capable of operating in the systems of FIGS. 4A-4D, according to an embodiment of the invention. An LTE terminal 800 is configured to operate in a Multiple Input Multiple Output (MIMO) system. Consequently, an antenna system 801 provides for multiple antennas to receive and transmit signals. The antenna system 801 is coupled to radio circuitry 803, which includes multiple transmitters 805 and receivers 807. The radio circuitry encompasses all of the Radio Frequency (RF) circuitry as well as base-band processing circuitry. As shown, layer-1 (L1) and layer-2 (L2) processing are provided by units 809 and 811, respectively. Optionally, layer-3 functions can be provided (not shown). Module 813 executes all MAC layer functions. A timing and calibration module 815 maintains proper timing by interfacing, for example, an external timing reference (not shown). Additionally, a processor 817 is included. Under this scenario, the LTE terminal 800 communicates with a computing device 819, which can be a personal computer, work station, a PDA, web appliance, cellular phone, etc.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   detecting a radio link failure condition of a wireless link employed by a mobile unit;
   determining an identifier of the mobile unit;
   determining whether the mobile unit can re-use connection parameters that were established prior to the failure condition; and
   instructing the mobile unit to re-use the connection parameters based on the determination.

2. A method according to claim 1, further comprising:
   determining whether the connection parameters are stored in a serving base station of the mobile unit.

3. A method according to claim 1, wherein the identifier is included in a connection request message that is received from the mobile unit.

4. A method according to claim 3, wherein the connection request message further includes a prior base station identifier and/or cell identifier.

5. A method according to claim 1, further comprising:
   instructing the mobile unit to establish a new connection to a serving base station and to delete the connection parameters.

6. A method according to claim 1, wherein the connection parameters are stored in the base station, the method further comprising:
   starting a context timer and deleting the connection parameters upon expiry of the context timer.

7. A method according to claim 1, further comprising:
   generating a request for obtaining the connection parameters from a centralized node or a former serving base station.

8. A method according to claim 1, wherein the mobile unit operates according to a Third Generation Partnership Project (3GPP) Long Term Evolution (LTE) architecture.

9. A method according to claim 8, wherein the connection parameters include access stratum related parameters.

10. An apparatus comprising:
    at least one processor; and
    at least one memory including computer program code for one or more programs,
    the at least one memory and the computer program code configured to, with the at least one processor cause the apparatus to perform at least the following,
    detect a radio link failure condition of a wireless link employed by a mobile unit,
    determine an identifier of the mobile unit,
    determine whether the mobile unit can re-use connection parameters that were established prior to the failure condition, and
    instruct the mobile unit to re-use the connection parameters based on the determination.

11. An apparatus according to claim 10, wherein the identifier is included in a connection request message that is received from the mobile unit.

12. An apparatus according to claim 11, wherein the connection request message further includes a prior base station identifier and/or cell identifier.

13. An apparatus according to claim 10, wherein the apparatus is further caused to:
    instruct the mobile unit to establish a new connection and to delete the connection parameters.

14. An apparatus according to claim 10, wherein the apparatus is further caused to:
    start a context timer and to delete the connection parameters upon expiry of the context timer.

15. An apparatus according to claim 10, wherein the apparatus is further caused to:
    generate a request for obtaining the connection parameters from a centralized node or a former serving base station.

16. An apparatus according to claim 10, wherein the apparatus and the mobile unit operate according to a Third Generation Partnership Project (3GPP) Long Term Evolution (LTE) architecture.

17. An apparatus according to claim 16, wherein the connection parameters include access stratum related parameters.

18. A method comprising:
    detecting failure of a radio link;
    transmitting response to the detection, an identifier to a serving base station for context recovery; and
    receiving a message indicating that connection parameters associated with the failed radio link are to be re-used.

19. A method according to claim 18, wherein the transmitting comprises transmitting a connection request message that includes the identifier.

20. A method according to claim 19, wherein the connection request message further includes a prior base station identifier and/or cell identifier.

21. A method according to claim 18, wherein the message specifies establishment of a new radio link, and deletion of the connection parameters associated with the failed radio link.

22. A method according to claim 18, further comprising:
    starting a context timer and deleting the connection parameters upon expiry of the context timer.

23. A method according to claim 18, wherein the serving base station operates according to a Third Generation Partnership Project (3GPP) Long Term Evolution (LTE) architecture.

24. A method according to claim 23, wherein the connection parameters include access stratum related parameters.

25. An apparatus comprising:
    at least one processor; and
    at least one memory including computer program code for one or more programs,
    the at least one memory and the computer program code configured to, with the at least one processor, cause the apparatus to perform at least the following,
    detect failure of a radio link,
    transmit, in response to the detection, an identifier to a serving base station for context recovery, receive a message indicating that connection parameters associated with the failed radio link are to be re-used.

26. An apparatus according to claim 25, wherein the transmission of the identifier comprises transmitting a connection request message that includes the identifier.

27. An apparatus according to claim 26, wherein the connection request message further includes a prior base station identifier and/or cell identifier.

28. An apparatus according to claim 25, wherein the message specifies establishment of a new radio link, and deletion of the connection parameters associated with the failed radio link.

29. An apparatus according to claim 25, wherein the apparatus is further caused to:
start a context timer and to delete the connection parameters upon expiry of the context timer.

30. An apparatus according to claim 25, wherein the apparatus and the serving base station operate according to a Third Generation Partnership Project (3GPP) Long Term Evolution (LTE) architecture.

31. An apparatus according to claim 30, wherein the connection parameters include access stratum related parameters.

32. A system comprising:
means for detecting a radio link failure condition of a wireless link employed by a mobile unit;
means for determining an identifier of the mobile unit;
means for determining whether the mobile unit can re-use connection parameters that were established prior to the failure condition; and
means for instructing the mobile unit to re-use the connection parameters based on the determination.

33. A system according to claim 32, wherein the mobile unit is configured to operate operates according to a Third Generation Partnership Project (3GPP) Long Term Evolution (LTE) architecture.

34. A system comprising:
means for detecting failure of a radio link;
means for transmitting, in response to the detection, an identifier to a serving base station for context recovery; and
means for receiving a message indicating that connection parameters associated with the failed radio link are to be re-used.

35. A system according to claim 34, wherein the serving base station operates according to a Third Generation Partnership Project (3GPP) Long Term Evolution (LTE) architecture.

* * * * *